United States Patent [19]

Mattern

[11] Patent Number: 5,715,803
[45] Date of Patent: Feb. 10, 1998

[54] SYSTEM FOR REMOVING HAZARDOUS CONTENTS FROM COMPRESSED GAS CYLINDERS

[75] Inventor: Charles C. Mattern, Clermonte, Fla.

[73] Assignee: Earth Resources Corporation, Ocoee, Fla.

[21] Appl. No.: 683,782

[22] Filed: Jul. 16, 1996

Related U.S. Application Data

[60] Continuation-in-part of Ser. No. 246,090, May 19, 1994, Pat. No. 5,535,730, which is a division of Ser. No. 55,852, Apr. 30, 1993, Pat. No. 5,339,876, and a continuation-in-part of Ser. No. 520,792, Aug. 30, 1995, which is a continuation-in-part of Ser. No. 119,717, Sep. 10, 1993, Pat. No. 5,460, 154.

[51] Int. Cl.$^6$ .............................. F41B 11/26; B65B 31/00
[52] U.S. Cl. .................... 124/70; 124/56; 141/1; 141/51
[58] Field of Search .................. 124/70, 71, 73, 124/75, 77, 56, 60; 141/1, 50

[56] References Cited

U.S. PATENT DOCUMENTS

| Re. 33,799 | 1/1992 | Gold et al. . | |
|---|---|---|---|
| 54,783 | 5/1866 | Scotton | 124/71 |
| 381,950 | 5/1888 | Pratt . | |
| 429,988 | 6/1890 | Zalinski | 124/73 X |
| 556,058 | 3/1896 | Huey | 124/70 X |
| 1,478,597 | 12/1923 | Bebler | 124/70 X |
| 1,806,270 | 5/1931 | Thompson . | |
| 2,101,762 | 12/1937 | Straub . | |
| 2,900,972 | 8/1959 | Marsh et al. | 124/63 |
| 2,960,977 | 11/1960 | Moorhead, Jr. | 124/70 |
| 3,394,905 | 7/1968 | Rapp . | |
| 3,422,808 | 1/1969 | Stein et al. . | |
| 3,428,037 | 2/1969 | Capriolo et al. . | |
| 3,430,619 | 3/1969 | Silver et al. | 124/71 |
| 3,939,816 | 2/1976 | Espy | 124/56 X |
| 3,993,221 | 11/1976 | Boynton et al. . | |
| 4,046,055 | 9/1977 | McDanolds et al. . | |
| 4,049,367 | 9/1977 | Tominaga et al. | 124/60 X |
| 4,110,929 | 9/1978 | Weigand . | |
| 4,166,481 | 9/1979 | Farris et al. . | |
| 4,169,403 | 10/1979 | Hanson . | |
| 4,349,054 | 9/1982 | Chipman et al. . | |
| 4,665,827 | 5/1987 | Ellis, II . | |
| 4,690,180 | 9/1987 | Gold . | |
| 4,881,517 | 11/1989 | Wackrow et al. . | |
| 4,944,333 | 7/1990 | Gold et al. . | |
| 5,017,047 | 5/1991 | Myles et al. . | |
| 5,025,730 | 6/1991 | Petrovich . | |
| 5,035,269 | 7/1991 | Pytryga et al. . | |

(List continued on next page.)

FOREIGN PATENT DOCUMENTS

| 815309 | 6/1969 | Canada | 124/71 |
|---|---|---|---|
| 1607991 | 10/1970 | Germany . | |
| 2120761 | 12/1983 | United Kingdom . | |

OTHER PUBLICATIONS

"Shock Test Squeezes Core Temperature", Science, vol. 267, Mar. 17, 1995, pp. 1597–1598.

(List continued on next page.)

*Primary Examiner*—Anthony Knight
*Attorney, Agent, or Firm*—Hunton & Williams

[57] ABSTRACT

A containment vessel is provided to allow the safe, environmentally acceptable release and recontainerization or other processing of hazardous contents from compressed gas cylinders or other target container. The containment vessel is used to position a gas cylinder or other target container adjacent to one or more pneumatic guns. A variety of projectiles are provided for use with the pneumatic guns to pierce the body of the target container. Each pneumatic gun includes a pneumatic chamber within which is developed a secondary force and a gun barrel attached to the containment vessel to fire a projectile which will puncture the target. Connections are provided for communicating with the containment vessel for evacuating and recontainerizing the contents released by rupturing the target without releasing the contents into the environment. All of the gas cylinder processing operations may be conducted remotely.

19 Claims, 10 Drawing Sheets

U.S. PATENT DOCUMENTS

| | | |
|---|---|---|
| 5,067,529 | 11/1991 | Gonzalez-Miller et al. . |
| 5,114,043 | 5/1992 | Collins, Jr. . |
| 5,134,921 | 8/1992 | Breed et al. . |
| 5,150,909 | 9/1992 | Fitzwater . |
| 5,163,483 | 11/1992 | Eckman . |
| 5,163,585 | 11/1992 | Campbell . |
| 5,186,219 | 2/1993 | Gold et al. . |
| 5,210,368 | 5/1993 | Heller, Jr. et al. . |
| 5,230,324 | 7/1993 | Van Horssen et al. . |
| 5,265,762 | 11/1993 | Campbell et al. . |
| 5,325,787 | 7/1994 | Boual . |
| 5,339,876 | 8/1994 | Mattern . |
| 5,365,913 | 11/1994 | Walton ............................. 124/75 |
| 5,460,154 | 10/1995 | Mattern et al. ................. 124/71 X |
| 5,535,730 | 7/1996 | Mattern . |

OTHER PUBLICATIONS

Browne, "Big Gun Makes Hydrogen Into A Metal", New York Times, Mar. 26, 1996, pp. C1 and C7.

"Specifications for Chemical Control Site Gas Cylinder Removal," US Army Corps of Engineers, Jun. 1987.

"Supplement C to Project Eagle—Phase II Demilitarization and Disposal of the M34 Cluster at Rocky Mountain Arsenal Final Plan (Feb. 1973)," Jul. 1975.

"Alternative Technologies for the Destruction of Chemical Agents and Munitions," National Academy Press, Washington, D.C. 1993.

Memo, New Jersey State Department of Environmental Protection, Feb. 4, 1982, two pages.

"No Known Treatment For Accident Victims," Sunday Times, Trenton, N.J., Feb. 28, 1982, p. B7.

"This Stuff Is Getting To All Of Us!," Fire Engineering, Apr. 1983, pp. 21,25–28.

"Poison Spills Impact Remains," Richmond Times–Dispatch, Mar. 6, 1983, pp. A1–A2.

"Sometimes Out Of A Space Movie," Richmond Times–Dispactch, Feb. 1982, pp. A1–A2.

"Pentaborane Release, Envirnomental Laboratories, Hanover County, VA.," National Response Team Briefing, Mar. 1982, pp. 1–2.

Memo, CECOS International, Inc. to Enviromental Emergency Branch, Mar. 17, 1982, 5 pages.

Solkatronic Chemicals, Inc., Instruction Manual for Model 5502 Emergency Response Containment Vessel, Oct. 1990.

SYSTEM FOR REMOVING HAZARDOUS CONTENTS FROM COMPRESSED GAS CYLINDERS

This application is a continuation-in-part of U.S. patent application Ser. No. 08/246,090 filed May 19, 1994, now U.S. Pat. No. 5,535,730 issued Jul. 16, 1996, which is a divisional of U.S. patent application Ser. No. 08/055,852 filed Apr. 30, 1993 now U.S. Pat. No. 5,339,876 issued Aug. 23, 1994; and, a continuation-in-part of U.S. patent application Ser. No. 08/520,792 filed Aug. 30, 1995, currently pending, which is a continuation-in-part of U.S. patent application Ser. No. 08/119,717 filed Sep. 10, 1993 now U.S. Pat. No. 5,460,154 issued Oct. 24, 1995.

TECHNICAL FIELD OF THE INVENTION

This invention relates to the field of managing compressed gas cylinders and particularly compressed gas cylinders in a deteriorated condition.

BACKGROUND OF THE INVENTION

Compressed gas cylinders may become unserviceable for several reasons such as valve assembly failure, damage or deterioration to the cylinder body, and/of damage or deterioration of pipe/hose connections associated with the valve assembly. The hazardous nature of compressed gas cylinders in a deteriorated condition has become the focus of increasing attention resulting in government regulations which limit the uncontrolled discharge of their contents to the environment.

Examples of cylinder rupture vessels or containment vessels used for safely removing hazardous contents from deteriorated compressed gas cylinders are shown in U.S. Pat. Nos. 4,690,180 titled "Cylinder Rupture Vessel"; U.S. Pat. No. 4,944,333 titled "Cylinder Rupture Vessel with Clamps for Immobilizing a Container Within the Vessel", and U.S. Pat. No. 5,186,219 titled "Cylinder Rupture Vessel". These patents disclose containment vessels and their associated systems to secure a gas cylinder or similar container within the containment vessel and to puncture or pierce the cylinder in a safe, controlled manner. The cylinder rupture vessels and their associated systems allow for environmentally acceptable removal of the contents from the cylinder and further processing of the contents as desired. The above-listed patents are incorporated by reference for all purposes within this application.

Deteriorated gas cylinders may be ruptured in a safe, controlled manner by using a puncture spike or punch as shown in U.S. Pat. No. 4,690,180. Hydraulic drill assemblies, as shown in U.S. Pat. No. 4,944,333, have also been used to penetrate gas cylinders to allow the controlled release of the contents of the cylinders within a containment vessel. In addition, various types of projectiles have previously been fired at gas cylinders positioned within a containment vessel to rupture the walls of the gas cylinder to release the contents from the gas cylinder into the interior of the containment vessel.

SUMMARY OF THE INVENTION

In accordance with the present invention, a containment vessel and its associated systems are provided to substantially eliminate or reduce disadvantages and problems associated with prior systems for releasing the contents from deteriorated pressurized cylinders or other types of containers.

The present invention was developed to allow the cylinder contents to be released in a contained and controlled environment by remote operation. Accessing the contents of a cylinder in a containment vessel permits identification and proper disposal in accordance with government regulations without adversely affecting the environment. One function of the present invention is to provide a means of accessing the contents of pressurized compressed gas cylinders in a safe, environmentally acceptable manner.

A technical advantage of the present invention is that it provides an environmentally safe methodology for sampling and recontainerizing or disposing of compressed gases, liquids or other material approximately stored in pressurized cylinders of various sizes, configurations, and pressures that are in a deteriorating or damaged condition.

Another technical advantage of the present invention is that it provides a primary containment vessel which can be operated inside of an airtight secondary containment structure by remote control from outside of the secondary containment structure thereby providing a high safety factor for the environment and personnel.

A further technical advantage of the present invention is that it provides a simple, reliable mechanism for use in aggressive chemical environments which is mobile and which can be quickly deployed to the location of target cylinders without having to move the cylinders over public byways.

Yet another technical advantage of the present invention is that it provides an improved pneumatic gun capable of propeling a projectile to pierce a target cylinder and thereby access its contents. The improved pneumatic gun includes any of a number of improved means for generating a force necessary to propel the projectile.

In another embodiment, the present invention comprises a system for piercing a container disposed within a containment vessel. The system comprises a containment vessel having an interior portion and including means for gaining access to the interior portion and means for sealing the interior portion. The system further comprises a means for propelling a projectile substance, or a pneumatic gun, including a barrel having a bore therethrough from which the projectile substance is propelled and being in communication with the interior portion of the containment vessel. The means for propelling a projectile substance also includes a reservoir having a chamber therein, and having a first end connected to a first end of the bore of the barrel and a rupture disc disposed between the chamber and the bore to prevent communication between the chamber and the bore until a pressure in the chamber causes the rupture disc to rupture. The means for propelling a projectile further includes means for generating a force within the chamber and is capable of propelling either a solid projectile or a projectile comprising liquid and particulate matter.

In accordance with one aspect of the present invention, an improved projectile is provided to pierce high pressure cylinders and/or thick wall containers. The improved projectile has a relatively large mass to develop sufficient momentum for piercing a selected target while the portion of the projectile that actually pierces the selected target has a small cross sectional area to enhance penetration capabilities.

Another technical advantage of the present invention includes providing a projectile with multiple portions. The projectile initially has a relatively large mass and a relatively large cross section to develop sufficient momentum to pierce a selected target. The exterior of the projectile is selected to minimize friction losses with the bore of the associated pneumatic gun barrel. The portion of the projectile which pierces the selected target has a small cross sectional area for improved penetration. Other portions of the projectile have a larger cross sectional area and do not penetrate the selected target.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiments of the present invention and its advantages are best understood by referring to FIG. 1 through FIG. 11 of the drawings, like numerals being used for like and corresponding parts of the various drawings.

Figure 1:
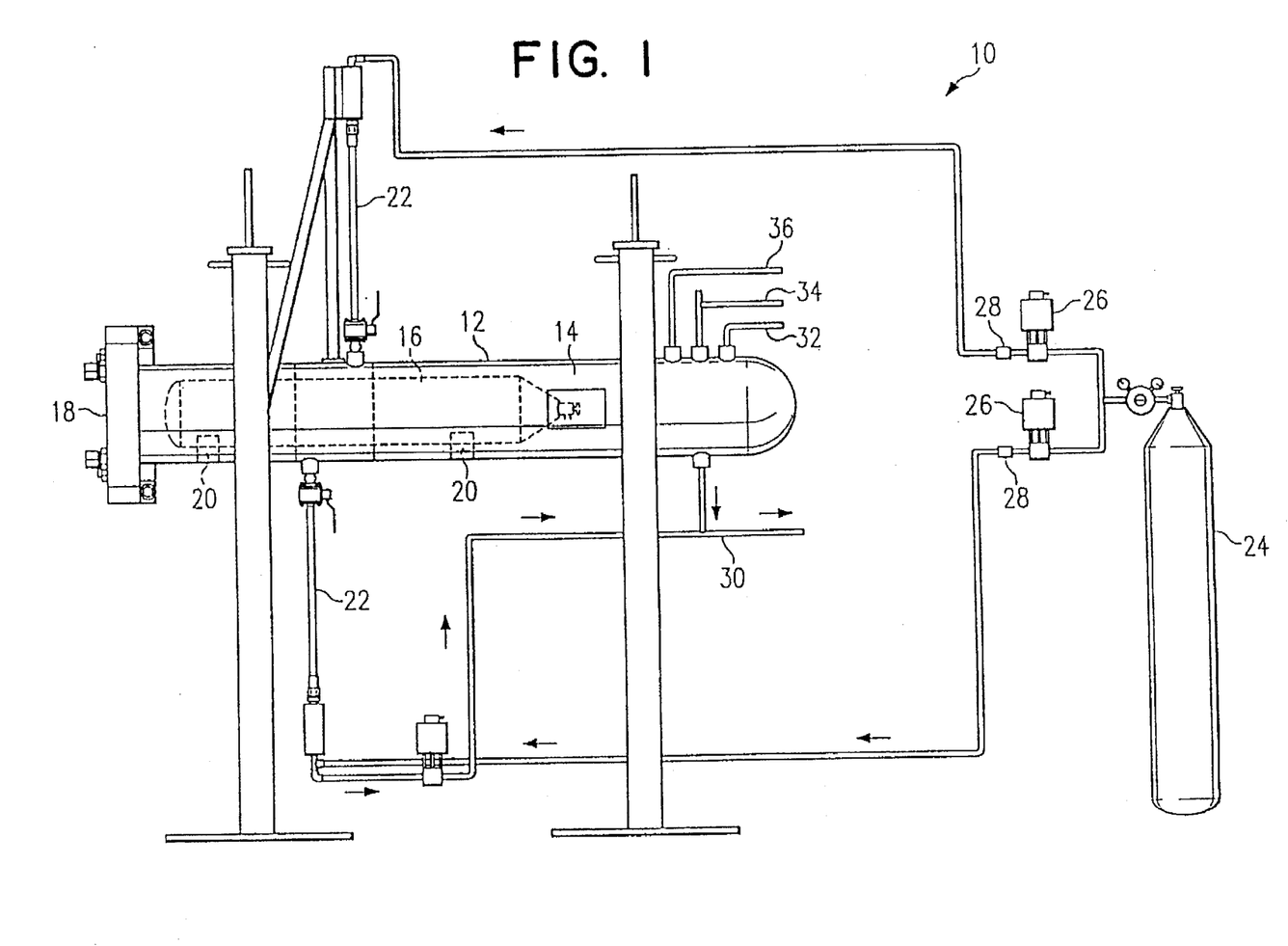
FIG. 1 is a schematic drawing in elevation with portions broken away of a containment vessel and associated systems incorporating the present invention.

FIG. 1 illustrates a system indicated generally at 10 constructed according to the teachings of the present invention for removing hazardous contents from compressed gas cylinders. System 10 comprises a mobile, airtight containment vessel 12 having a hollow enclosed chamber 14 of appropriate size to house a target compressed gas cylinder 16 whose contents are to be removed. An access member 18 is provided at one end of containment vessel 12 for communicating with enclosed chamber 14 of containment vessel 12. V-shaped bearing plates 20 are disposed transverse to the longitudinal axis and along the bottom of containment vessel 12. With access member 18 removed from containment vessel 12, cylinder 16 is placed in containment vessel 12 and is supported by plates 20. Plates 20 may be suitably positioned to support and to center a cylinder 16 of various conventional sizes.

The system for removing hazardous contents from compressed gas cylinders also comprises a mechanism for puncturing cylinder 16 to facilitate removal of the contents of cylinder 16. The mechanism for puncturing cylinder 16 may comprise, for example, one or more pneumatic guns. As shown in the embodiment of FIG. 1, two pneumatic guns 22 are connected to containment vessel 12 such that pneumatic guns 22 are in communication with enclosed chamber 14. Pneumatic guns 22 provide the mechanism for system 10 to puncture cylinder 16 thereby facilitating the removal of the contents of cylinder 16. Pneumatic guns 22 may, for example, be offset longitudinally and radially from each other as shown in FIG. 1. The pneumatic gun 22 connected to the bottom of containment vessel 12 may be appropriately positioned to maximize the drainage from a cylinder 16 containing a compressed liquid when punctured by pneumatic gun 22. Additionally, containment vessel 12 may be tilted along its longitudinal axis to facilitate removal of liquids from cylinder 16.

A remote inert high pressure compressed gas supply 24 is connected to pneumatic guns 22 through high pressure valves 26. Gas supply 24 may comprise, for example, a supply of He, $N_2$, Ar, or other appropriate inert gas. The directional flow of inert gas from gas supply 24 to pneumatic guns 22 is controlled by check valves 28.

Containment Vessel 12 contains four additional connection ports. First, an evacuation port 30 is connected to the bottom of containment vessel 12 in communication with enclosed chamber 14 for evacuating the contents released from cylinder 16 during operation of system 10. Second, a vacuum port 32 is connected to containment vessel 12 in communication with enclosed chamber 14. A conventional vacuum pump (not shown) may be connected to vacuum port 32 for purging air and other gases from enclosed chamber 14. Third, pressure control port 34 is connected to containment vessel 12 in communication with enclosed chamber 14 for controlling pressure in enclosed chamber 14. Finally, inert gas port 36 is connected to containment vessel 12 in communication with enclosed chamber 14 for introducing inert gas, such as He, $N_2$, Ar, or other appropriate inert gas, into enclosed chamber 14.

In operation, system 10 removes hazardous contents from cylinder 16 by loading cylinder 16 into enclosed chamber 14 of containment vessel 12 through an opening in containment vessel 12. Access member 18 is placed over the opening of containment vessel 12 to seal enclosed chamber 14. Air and other gasses may be purged from enclosed chamber 14 via vacuum port 32 by a vacuum pump. An inert gas, such as He, $N_2$, Ar, or other appropriate inert gas, may be introduced into enclosed chamber 14 of containment vessel 12 through inert gas port 36 until the atmosphere in enclosed chamber 14 is substantially inert. An inert gas environment in enclosed chamber 14 will substantially reduce the risk of a violent reaction within enclosed chamber 14 upon release of the contents of cylinder 16.

Once enclosed chamber 14 is loaded with cylinder 16 as described above, the pneumatic guns 22 may be fired. Pneumatic pressure supplied from gas supply 24 via valves 26 and 28 causes pneumatic guns 22 to propel a projectile at cylinder 16 thereby rupturing cylinder 16. For safety reasons, gas supply 24 may be remotely activated to provide inert gas to pneumatic guns 22. The details of pneumatic guns 22 are described below with respect of FIGS. 4–11.

The projectile may be a solid projectile or a projectile substance such as, a combination of water and a particulate material (e.g., sand). A solid projectile is preferable for accessing the contents of compressed gas cylinders and other containers having hard enclosures. Details of certain solid projectile designs are described below in conjunction with FIGS. 3a–e. The term projectile is used hereinafter to refer to either solid projectiles or projectile substances.

Figure 2:
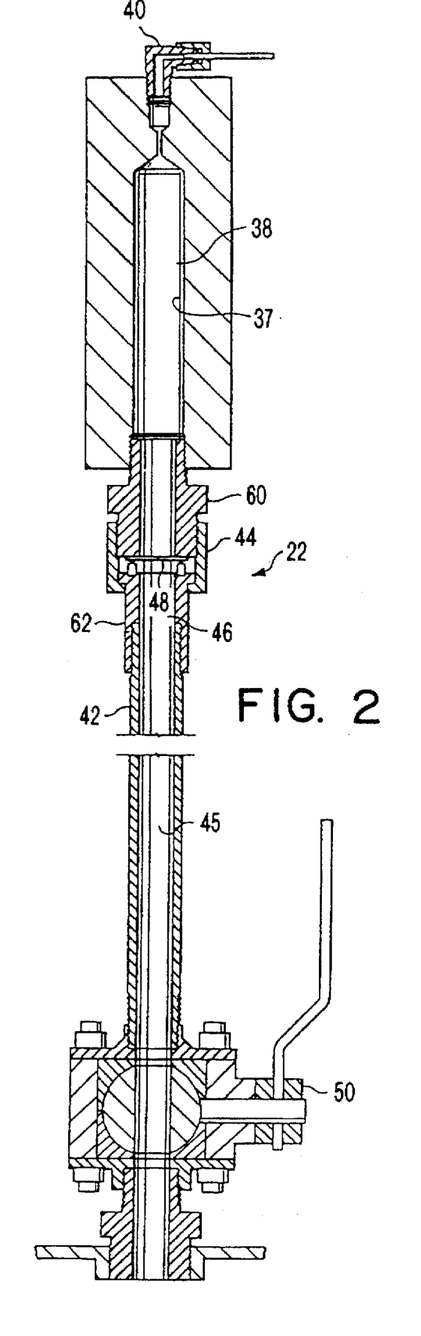
FIG. 2 is a schematic drawing in section with portions broken away showing a pneumatic gun for use with the containment vessel of FIG. 1.

FIG. 2 illustrates a pneumatic gun 22 for use with system 10 of FIG. 1. Pneumatic gun 22 comprises a pneumatic reservoir 38 having a chamber 37 therein, and a connector 40 for attaching a source of pneumatic pressure to reservoir 38. In the embodiment of FIG. 1, pneumatic pressure is supplied to reservoir 38 via connector 40 from gas supply 24. A barrel 42 is connected to an end of reservoir 38 opposite connector 40 by a detachable coupling 44. Barrel 42 comprises bore 45 extending longitudinally therethrough and having a first portion 46 at the end of barrel 42 adjacent coupling 44. If desired, the inside diameter of portion 46 may be reduced to assist with releasably positioning a projectile therein.

A rupture disc 48 designed to fail at a predetermined pressure is disposed in longitudinal bore 45 between barrel 42 and chamber 37 of reservoir 38. The volume of chamber 37 is at least approximately equal to the volume of barrel 42. A valve 50 connects barrel 42 with containment vessel 12 to control communication between barrel 42 and enclosed chamber 14.

In operation, pneumatic gun 22 is loaded by disengaging coupling 44 from reservoir 38 and sliding coupling 44 down the outer surface of barrel 42 until reservoir 38 is able to move clear of barrel 42. A projectile, such as shown in FIGS. 3a–3e, may be inserted into barrel 42 at first portion 46. If a projectile substance such as discussed above is used, a soft plug 66 (as is shown in FIGS. 4–11) may be necessary to prevent the projectile substance from leaking out. Rupture disc 48 is placed across the exposed end of barrel 42. Reservoir 38 is repositioned over barrel 42 such that ruptured disc 48 is disposed to separate barrel 42 from chamber 37 of reservoir 38. Coupling 44 is repositioned on barrel 42 to again securely connect reservoir 38 with barrel 42. In this configuration, pneumatic gun 22 is ready to propel a projectile at the cylinder 16 in enclosed chamber 14.

To launch the projectile, gas supply 24 is remotely activated to provide inert gas to chamber 37. The gas pressure in chamber 37 increases until it reaches the predetermined pressure at which ruptured disc 48 will fail or rupture leaving a hole approximately equal in size to the cross-sectional area of longitudinal bore 45 of barrel 42 below rupture disc 48. The predetermined pressure at which rupture disc 48 fails depends on the material and design of rupture disc 48. Therefore, the speed at which the projectile is propelled at cylinder 16 by pneumatic gun 22 is controlled in part by the selection of the material and design for rupture disc 48. For example, a rupture disc 48 made from a material that will fail at a higher pressure will propel a projectile at a higher speed. The force of the pressurized gas in chamber 37 of reservoir 38 is released against the back of the projectile causing the projectile to accelerate to a speed that will pierce cylinder 16. In this manner, ruptured disc 48 comprises the trigger mechanism for pneumatic gun 22.

In addition to gas pressure in chamber 37, the mass of a projectile placed in longitudinal bore 45 and the effective cross sectional area determine the amount of momentum imparted to the projectile by pneumatic gun 22. High momentum at the point of impact is desired to penetrate high pressure/thick wall containers.

In the event that the projectile does not pierce cylinder 16, pneumatic gun 22 may be reloaded. Prior to reloading pneumatic gun 22, valve 50 is closed to isolate barrel 42 from enclosed chamber 14. This allows repeated attempts to puncture cylinder 16 without having to remove cylinder 16 from enclosed chamber 14. To determine if cylinder 16 is successfully punctured, enclosed chamber 14 may be monitored during operation of system 10 by, for example, closed-circuit video or pressure and temperature transducers.

In FIG. 2, longitudinal bore 45 is shown with a uniform inside diameter. If desired, bore 45 may be tapered to improve the performance of selected projectiles.

Figure 4:
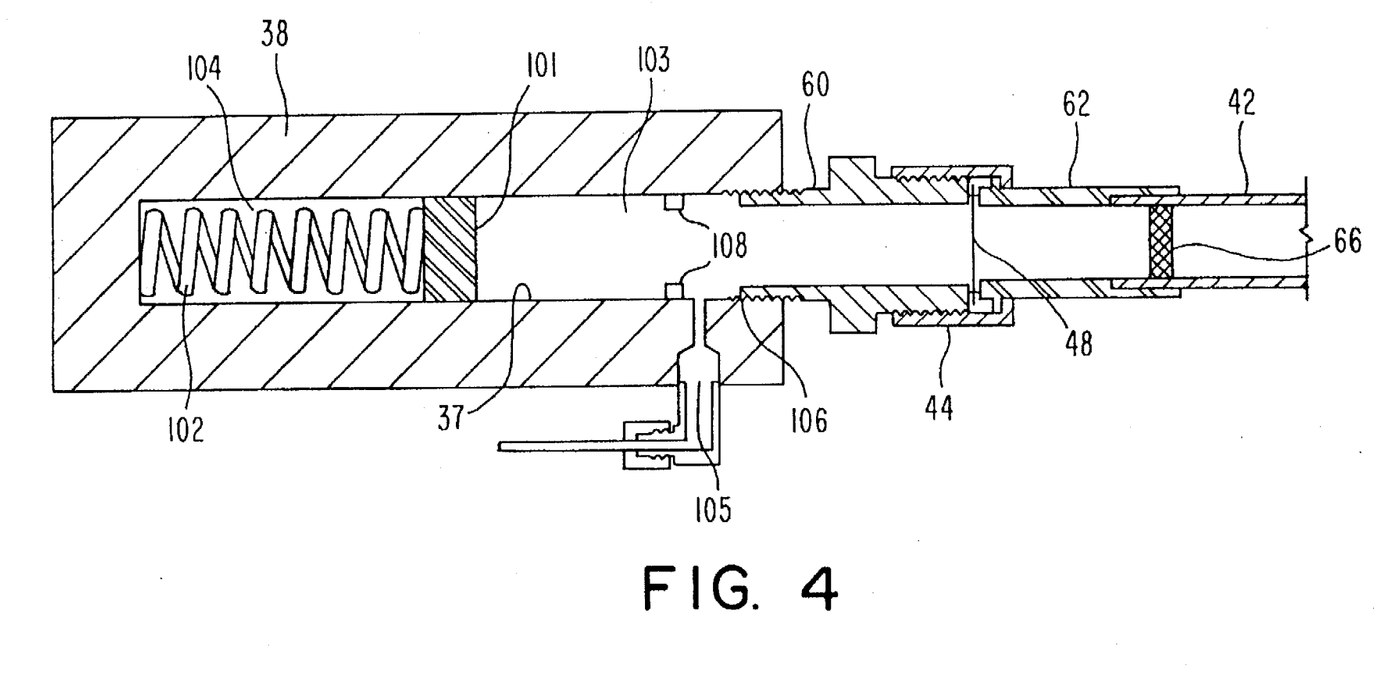
FIG. 4 is a first modified pneumatic gun in accordance with a another embodiment of the present invention.

According to further embodiments of the present invention, pneumatic gun 22 is modified to provide a secondary force within chamber 37. The secondary force is provided by alternate modifications of gun 22 as shown in FIGS. 4–11. Referring to FIG. 4, in one embodiment of providing the secondary force, a piston 101 is slidably disposed within chamber 37 thereby dividing chamber 37 into a first portion 103 and a second portion 104. A spring 102 is provided within second portion 104. One end of spring 102 engages the surface of chamber 37 while the other end of spring 102 engages piston 101.

In operation, spring 102 and piston 101 cooperate to supply the secondary force. Pressurized gas is introduced into first portion 103 through inlet 105. As the pressure in first portion 103 increases, piston 101 is forced away from rupture disk 48, thereby compressing spring 102. The pressure within chamber 37 continues to rise until it is sufficient to rupture disk 48. The force of the gas escaping from chamber 37 into barrel 42 propels the projectile out of bore 45. According to this feature, as the pressure is released from first portion 103, spring 102 decompresses and drives piston 101 toward disk 48. This movement of piston 101 tends to compress the gas remaining between piston 101 and the exit end of barrel 42 due to the resistance provided by the projectile, and friction between the gas and the inner surfaces of barrel 42, bushing 62, coupling 44, disk 48, adapter 60 and first portion 103.

Although the gas and projectile are allowed to escape from the exit end of barrel 42, the movement of spring 102 and piston 101 results in a higher average pressure for propelling the projectile then the average pressure resulting from the discharge of compressed gas from first portion 103 alone. According to an aspect of this feature, spring 102 may be rigidly connected to piston 101, an inner surface of chamber 37, or both. Alternatively, spring 102 and piston 101 may be loosely placed within chamber 37. If this alternative arrangement is used, tabs 108 maybe provided to limit the movement of piston 101 within chamber 37.

Figure 5:
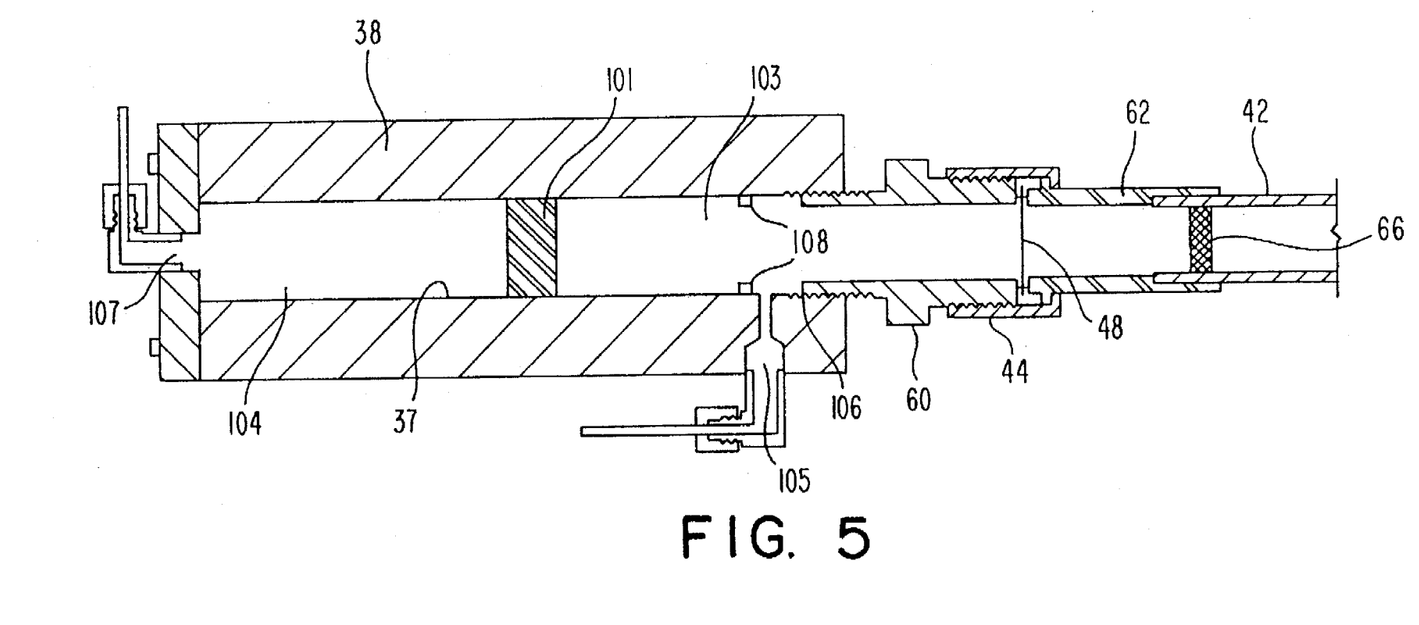
FIG. 5 is a second modified pneumatic gun in accordance with another embodiment of the present invention.

Referring to FIG. 5, according to a second embodiment of supplying the secondary force, a piston 101 is slidably disposed within chamber 37 as described above. Piston 101 separates chamber 37 into first portion 103 and second portion 104. A first inlet 105 provides communication between a pressurized gas source and first portion 103. A second inlet 107 provides communication between a pressurized gas source and second portion 104. The source of the pressurized gas for inlet 105 and inlet 107 maybe the same. Alternately, separate pressurized gas sources may be used.

In operation, pressurized gas is introduced into first portion 103 and second portion 104 through first inlet 105 and second inlet 107, respectively. The pressure in first and second portions 103, 104 is allowed to equilibrate at some level below the rupture pressure of disk 48. Next, second inlet 107 is closed and additional pressurized gas is introduced into first inlet 105. As the pressure in first portion 103 rises, piston 101 is forced away from disk 48, thereby compressing the gas in second portion 104. When a sufficient pressure is reached in first portion 103, disk 48 ruptures and the pressurized gas from first portion 103 escapes into bore 45. Concurrently, the pressurized gas in second portion 104 decompresses, thereby forcing piston 101 towards disk 48. In a manner similar to that described above, this movement of piston 101 causes the average pressure for propelling the projectile to be greater than the average pressure provided by the release of pressurized gas from first portion 103 alone. According to an aspect of this feature, in a manner similar to that described for the method in connection with FIG. 5, tabs 108 my be provided for limiting the movement from piston 101 toward disk 48.

Figure 6:
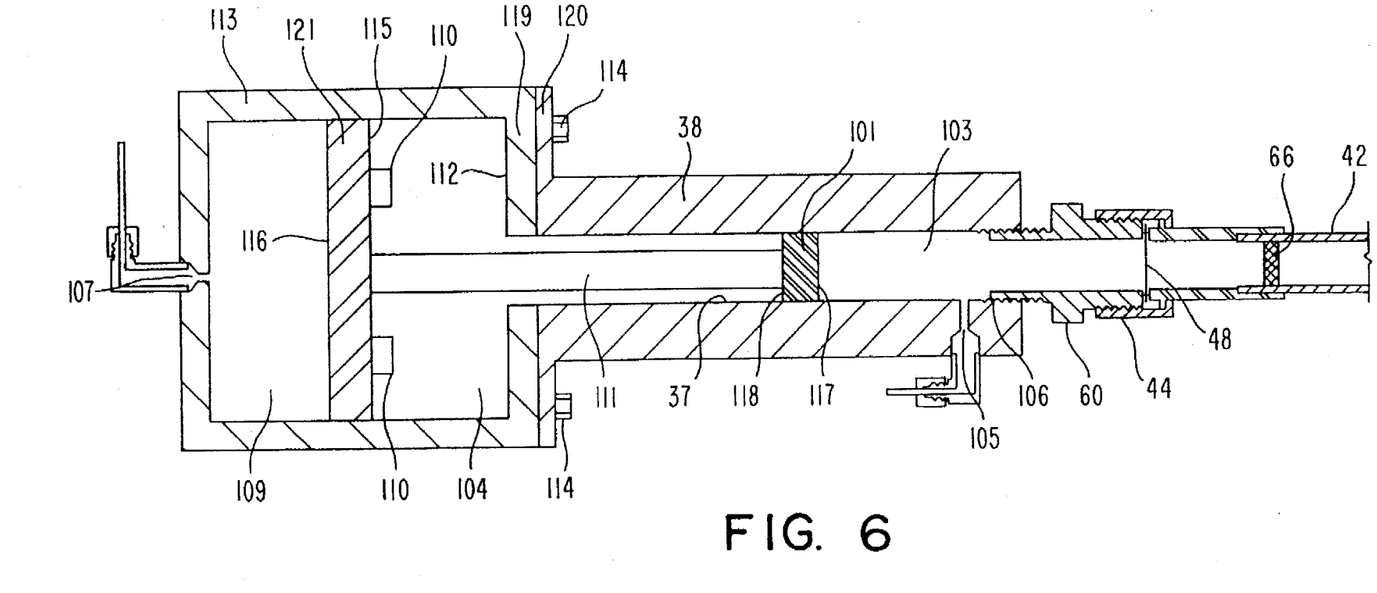
FIG. 6 is a third modified pneumatic gun in accordance with another embodiment of the present invention.

According to a third embodiment of supplying a secondary force, the pressure in the portion between piston 101 and rupture disk 48 may be multiplied by providing a pressure multiplier within chamber 37. Referring to FIG. 6, chamber 37 comprises the inner hollow spaces of pneumatic reservoir 38 and housing portion 113. Reservoir 38 preferably has a open end from which annular extension 120 extends radially outward. Housing portion 113 preferably has a open end from which annular extension 119 extends radially inward. Reservoir 38 and housing portion 113 are preferably connected at annular extensions 119, 120 by a plurality of bolts 114. The open ends of reservoir 38 and housing portion 113 preferably communicate with the inner spaces of reservoir 38 and housing 113 to create chamber 37.

A piston 101 is slidably disposed in chamber 37 within pneumatic reservoir 38 to create a first portion 103 between piston 101 and rupture disk 48. The pressure of the gas introduced into first portion 103, as describe below, may be multiplied by providing a pressure multiplier within chamber 37. This pressure multiplier comprises a second piston 121 which is slidably disposed in chamber 37 within housing portion 113. Preferably, pistons 121 and 101 are rigidly connected by a rod 111 to provide a constant distance between the pistons. A second portion 109 is defined by an end surface 116 of piston 121 and the inner surface of chamber 37. A third portion 104 is defined by the space between first piston 101 and second piston 121. Preferably, shock absorbers 110 are provided on second piston 121 for creating a buffer between second piston 121 and the inner surface of chamber 37 when piston 121 moves toward rupture disk 48 as described below.

In operation, pressurized gas is introduced into first portion 103 through first inlet 105. As the pressure in first portion 103 rises, the dual piston assembly, i.e., piston 101, rod 111, piston 121, and shock absorbers 110, is forced away from rupture disk 48. Preferably, the dual piston assembly is forced to a point were further movement of the dual piston assembly is limited by the inner surface of chamber 37. Inlet 105 is then closed, thereby isolating first portion 103. Next, pressurized gas is introduced into second portion 109 through second inlet 107, thereby forcing the dual piston assembly toward rupture disk 48 and further compressing the pressurized gas contained within first portion 103.

As shown in FIG. 6, an end surface 116 of second piston 121 has a greater surface area then an end surface 117 of first piston 101. This disparity in the end surface areas of first and second pistons 101, 121 results in the pressure in first portion 103 being greater than the pressure in second portion 109. Therefore, a rupture disk can be used which has a failure pressure greater than the source of the pressurized gas. For example, a disk rated to fail at 10,000 psig could be used with a pressurized gas source rated at 4,000 psig. This example is for illustration purposes only, however, and it is easily understood that the relationship between the source pressure and the rupture pressure of disk 48 will be determined, at least in part, by the relative surface areas of end surfaces 116 and 117.

Moreover, in a manner similar to that described above, as disk 48 ruptures and the pressurized gas of first portion 103 is released into bore 45 of barrel 42, the pressurized gas in second portion 109 provides a secondary force to increase the average pressure in bore 45 for propelling the projectile.

Figure 7:
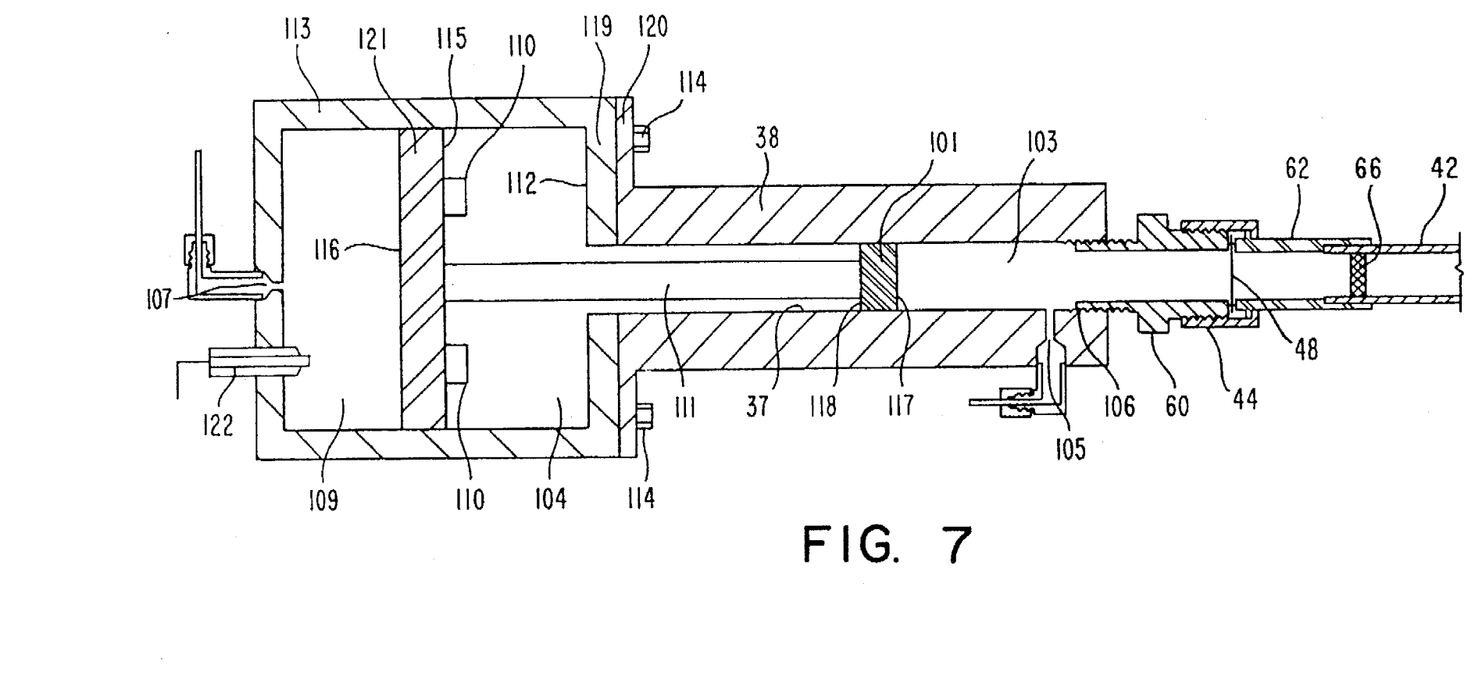
FIG. 7 is a fourth modified pneumatic gun in accordance with another embodiment of the present invention.

A fourth embodiment for generating a secondary force is shown in FIG. 7. According to this embodiment, pneumatic gun 22 preferably has the same elements as described in the previous embodiment of supplying a secondary force within chamber 37. In this embodiment, however, second portion 109 acts as a combustion chamber and is fitted with ignitor 122, which is preferably an electric spark ignitor.

In operation, a flammable gas mixture is first introduced into second portion 109 through second inlet 107. Inlet 107 is then closed, thereby isolating second portion 109. Pressurized gas is then introduced into first portion 103 through first inlet 105. Dual piston assembly 101, 111, 121, 113 is thus forced away from rupture disk 48. This movement of the dual piston assembly preferably compresses the flammable gas mixture contained in second portion 109. The flammable gas mixture is preferably compressed to a maximum compression of some pressure below the rupture pressure of disk 48. Ignitor 122 is then activated to ignite the flammable gas mixture. The resulting deflagration drives the dual piston assembly toward rupture disk 48. This motion causes the pressurized gas in first portion 103 to further compress until a sufficient pressure is achieved to rupture disk 48, thereby allowing the pressurized gas in first portion 103 to escape into bore 45 of barrel 42 and propel the projectile out of barrel 42. A technical advantage of this feature of the present invention is that the pressure in first portion 103 can be increased significantly above the source pressure. Therefore, a rupture disk 48 can be used that has a higher failure pressure than the pressure supplied by the source. Also, even though combustion of a flammable gas mixture is used as a power source, the target container is still not exposed to a flame because second portion 109 is not in communication with the interior of containment vessel 12.

Figure 8:
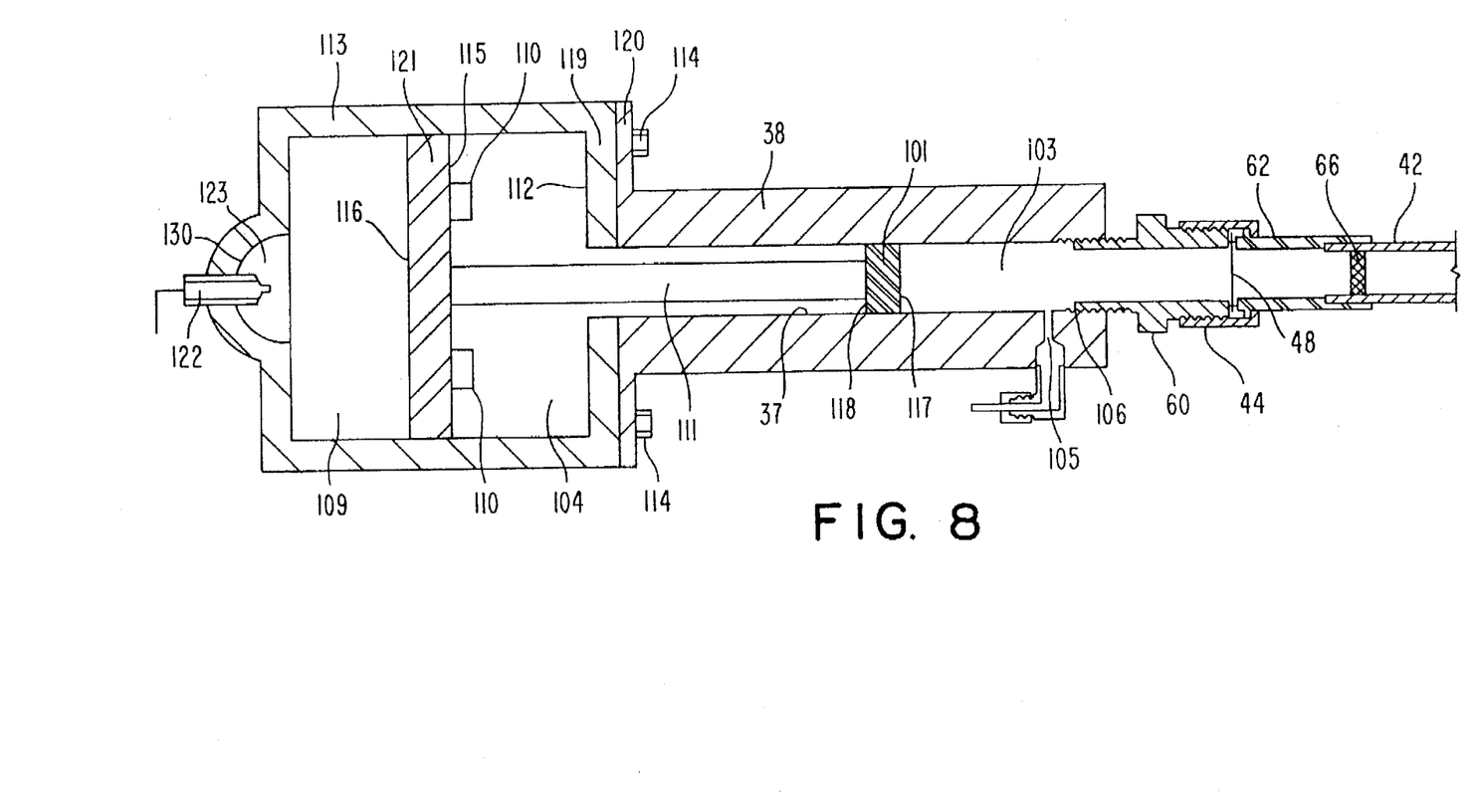
FIG. 8 is a fifth modified pneumatic gun in accordance with another embodiment of the present invention.

FIG. 8 depicts a fifth embodiment of generating a secondary force and a modification of the pressure multiplication feature. According to this modification, housing 113 has recessed portion 130 spaced apart from second piston 121 in a direction away from rupture disk 48. Recessed portion 130 is preferably filled with a solid propellant 123. Portion 130 is also fitted with an ignitor 122, which is preferably an electric spark ignitor as previously described.

In operation, pressurized gas is introduced into first portion 103 through first inlet 105, thereby causing the dual piston assembly to move away from rupture disk 48 and toward recessed portion 130. This movement causes ambient air in second portion 109 to compress. Preferably, a maximum compression in second portion 109 is reached, such that a pressure in second portion 109 is somewhere below the failure pressure for rupture disk 48. Solid propellant 123 is ignited by ignitor 122. The resulting explosion drives the dual piston assembly toward rupture disk 48. This motion causes the pressure in first portion 103 to rapidly rise. As a sufficient pressure is attained in first portion 103, disk 48 ruptures, thereby releasing the pressurized gas from first portion 103 into bore 45 of barrel 42 and propelling the projectile out of barrel 42. As described above, the pressure achieved in first portion 103 is greater than the pressure in third portion 109 resulting from the explosion of solid propellant 123. Also the driving force of the exploding solid propellant 123 causes the average pressure for propelling the projectile to be greater than an average pressure supplied solely by pressurized gas escaping from first portion 103.

Figure 9:
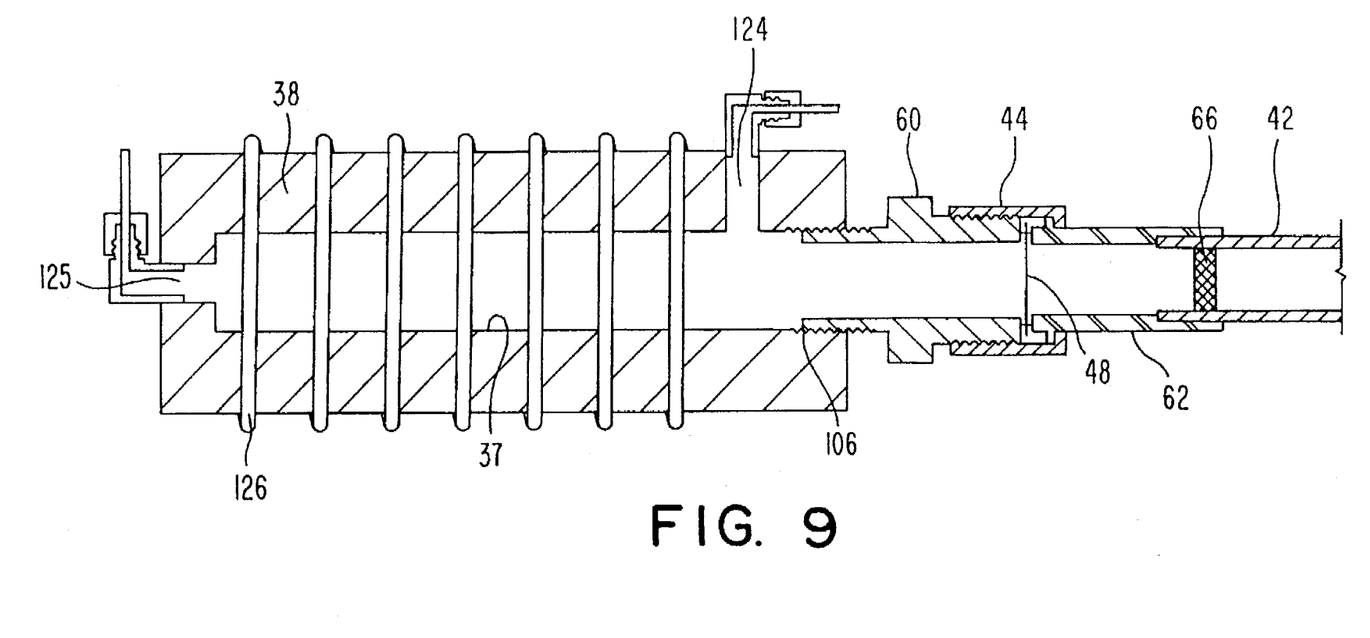
FIG. 9 is a sixth modified pneumatic gun in accordance with another embodiment of the present invention.
Figure 10:
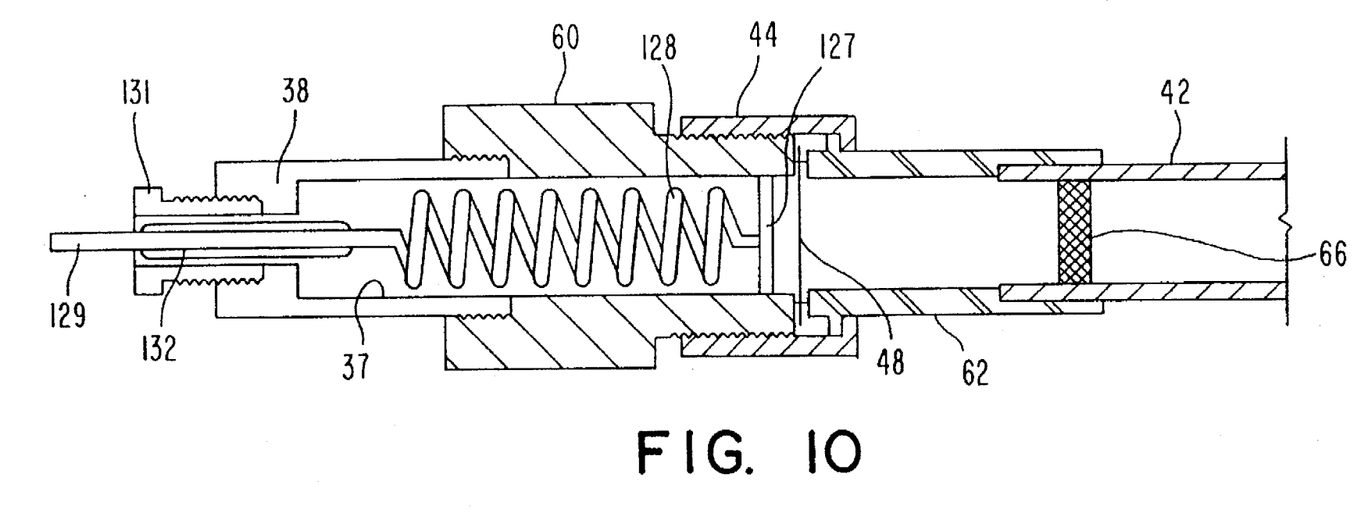
FIG. 10 is a seventh modified pneumatic gun in accordance with another embodiment of the present invention.
Figure 11:
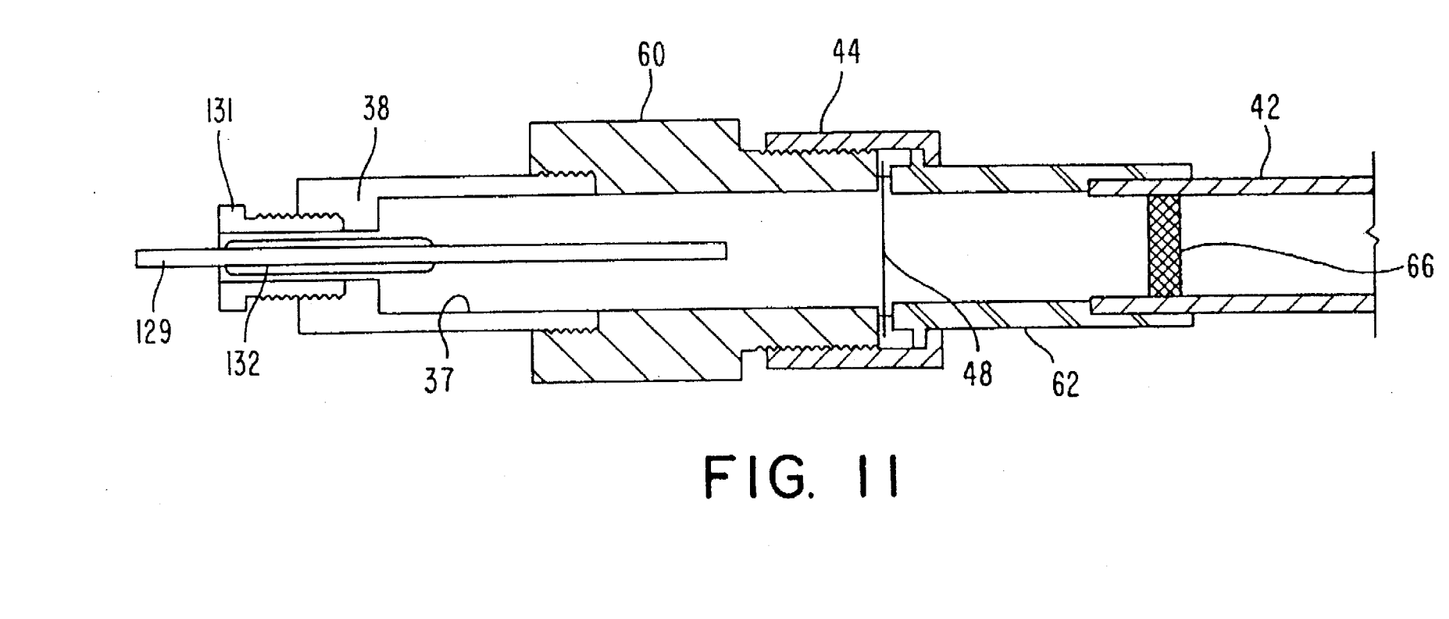
FIG. 11 is an eighth modified pneumatic gun in accordance with another embodiment of the present invention.

Referring to FIGS. 9–11, other embodiments of the present invention are provided in which the pressure in chamber 37 is increased by the heating of a liquid within chamber 37. One embodiment is depicted in FIG. 9. According to this embodiment, pneumatic gun 22 has pneumatic reservoir 38, chamber 37, adaptor 60, coupling 44, bushing 62, barrel 42, and bore 45, as described previously in connection with FIGS. 4 and 5. A heater coil 126 is disposed about an exterior surface of pneumatic reservoir 38. Reservoir 38 is preferably capable of transferring the heat supplied by heater coil 126 to chamber 37.

In operation, a cryogenic liquid is introduced into chamber 37 through inlet 125. Chamber 37 is preferably filled until the cryogenic liquid overflows through outlet 124. Inlet and outlet 125, 124 are then closed, thereby sealing chamber 37. Coil 126 is then energized, thereby warming chamber 37 and the cryogenic liquid contained therein. As the cryogenic liquid warms, the pressure in chamber 37 increases until a sufficient pressure is reached to rupture disk 48. Preferably, the cryogenic liquid is an inert liquid nitrogen. However, any cryogenic liquid maybe used.

Referring to FIGS. 10 and 11, according to other embodiments, a liquid may be heated within the chamber to create steam. The creation of steam increases the pressure within the chamber until the pressure is sufficient to rupture disk 48.

According to the embodiment shown in FIG. 10, a heating coil 128 is disposed within chamber 37. An insulated electrode 129 extends through a coupling portion 131 which fixedly holds electrode 129. Coupling portion 131 is preferably attached to reservoir 38 such that electrode 129 is insulated from reservoir 38 and such that one end of electrode 129 extends into chamber 37. Electrode 129 is operatively connected to heating coil 128 at its one end. The other end of electrode 129 preferably extends exterior to chamber 37 and is connected to a power source. Heating coil 128 is preferably grounded to reservoir 38 through grounding rod 127.

In operation, chamber 37 is preferably filled with water. However, other liquids that will produce steam when heated may be used. Electrode 129 is then energized by the power source to heat the water and create steam. The creation of steam preferably causes the pressure within chamber 37 to rise until a sufficient pressure is reached to rupture disk 48.

According to another embodiment, as shown in FIG. 11, an insulated electrode 129 is provided as described in connection with FIG. 10. However, a heating coil is not provided within chamber 37. Also, electrode 129 is not grounded to reservoir 38.

In operation, chamber 37 is preferably filled with an electrolyte, e.g., salt water. However, other ionized solutions capable of conducting electricity may be used. Electrode 129 is energized by a power source to heat the electrolyte and create steam. The creation of steam preferably causes the pressure within chamber 37 to rise until a sufficient pressure is reached to rupture disk 48.

It will be appreciated that some of the modifications to pneumatic gun 22 may not require a pressurized gas source such as compressed gas supply 24 shown in FIG. 1. Also, some modifications have more than one inlet for pressurized gas. In these modifications, the pressurized gas source can be modified as necessary to supply gas to the inlets. Alternately, separate sources of pressurized gas may be used.

FIGS. 3a through 3e illustrate five embodiments of a projectile for use with pneumatic gun 22 of system 10. Each embodiment of the projectile comprises interior and exterior portions.

Figure 3A:
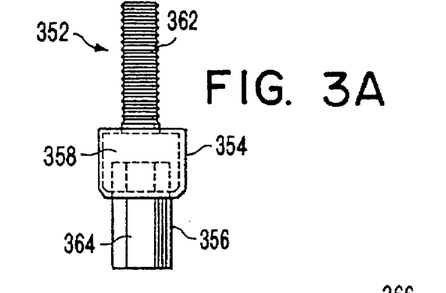
FIGS. 3a through 3e are drawings in elevation showing various projectiles satisfactory for use with the pneumatic gun of FIG. 2 and the containment vessel of FIG. 1.

FIG. 3a illustrates a projectile incorporating the present invention indicated generally at 352. Projectile 352 comprises exterior portion 354 and interior portion 356. Interior portion 356 has two parts—a metal bolt and a hexagonal shaft. Projectile 352 comprises a generally circular cross-section approximately equal to the cross-sectional area of bore 45 in barrel 42.

Exterior portion 354 comprises a deformable material, such as polytetraflouroethylene for reducing friction between projectile 352 and longitudinal bore 45 of barrel 42 upon acceleration of projectile 352 toward enclosed chamber 14. Exterior portion 354 is sized to fit snugly in bore 45 of barrel 42 thereby forming a fluid barrier which reduces pneumatic pressure leakage past projectile 352. Interior portion 356 of projectile 352 comprises a metal bolt with a head 358 surrounded by exterior portion 354 and a threaded shaft 362 extending in one direction from head 358 and a non-threaded shaft 364 extending in the other direction from head 358. Shaft 364 may comprise a hexagonal shape.

When projectile 352 contacts cylinder 16, non-threaded shaft 364 will penetrate the wall of cylinder 16 while head 358 prevents the remainder of projectile 352 from penetrating cylinder 16. The ratio of the mass of non-threaded portion 364 as compared with the other portions of projectile 352 is selected to optimize the transfer of energy to non-thread portion 364 when projectile 352 contacts cylinder 16. Various types of bonding may be used to secure non-threaded portion 364 to head 358 until projectile 352 contacts cylinder 16. Also, the length and cross sectional area of non-threaded portion 364 may be selected to optimize the penetration capability of projectile 352 with respect to different types of cylinders 16.

One embodiment of the present invention which performs satisfactorily includes a projectile 352 with a total weight of approximately fifty grams and a diameter of approximately ¾ inch. Non-threaded portion 364 weights approximately eleven grams and the bolt weights approximately forty nine grams.

Figure 3B:
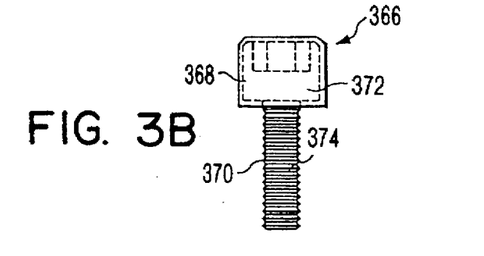

FIG. 3b illustrates a projectile indicated generally at 366. Projectile 366 comprises exterior portion 368 and interior portion 370. Projectile 366 comprises a generally circular cross-section approximately equal to the cross-sectional area of bore 45 in barrel 42. Exterior portion 368 comprises a deformable material, such as polytetraflouroethylene, for reducing friction between projectile 366 and longitudinal bore of barrel 42 upon acceleration of projectile 66 toward enclosed chamber 14. Exterior portion 368 is sized to fit snugly into portion 46 of barrel 42 thereby forming a fluid barrier. Interior portion 370 of projectile 366 comprises a metal bolt with a head 372 surrounded by exterior portion 368 and a threaded shaft 374 extending in one direction from head 372.

Figure 3C:
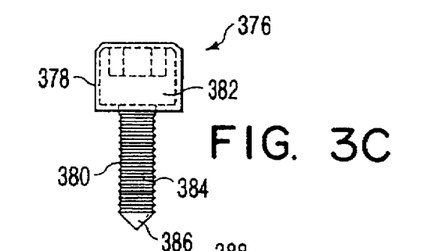

FIG. 3c illustrates a projectile indicated generally at 376. Projectile 376 comprises exterior portion 378 and interior portion 380. Projectile 376 comprises a generally circular cross-section approximately equal to the cross-sectional area of bore 45 in barrel 42. Exterior portion 378 comprises a deformable material, such as polytetraflouroethylene, for reducing friction between projectile 376 and longitudinal bore of barrel 42 upon acceleration of projectile 376 toward enclosed chamber 14. Exterior portion 378 is sized to fit snugly in first portion 46 of barrel 42 thereby forming a fluid barrier. Interior portion 380 of projectile 376 comprises a metal bolt with a head 382 surrounded by exterior portion 378 and a threaded shaft 384 extending in one direction from head 382 having a pointed tip 386 on one end opposite from head 382.

Figure 3D:
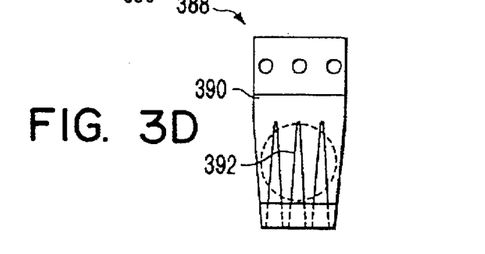

FIG. 3d illustrates a projectile indicated generally at 388. Projectile 388 comprises exterior portion 390 and interior portion 392. Projectile 388 comprises a generally circular cross-section approximately equal to the cross-sectional area of bore 45 in barrel 42. Exterior portion 390 comprises a deformable material, such as a packing material, for reducing friction between projectile 390 and longitudinal bore of barrel 42 upon acceleration of projectile 388 toward enclosed chamber 14. Exterior portion 390 is sized to fit snugly in first portion 46 of barrel 42 thereby forming a fluid barrier. Interior portion 392 of projectile 388 comprises a metal ball.

Figure 3E:
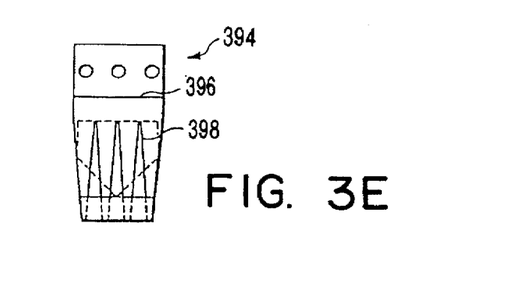

FIG. 3e illustrates a projectile indicated generally at 394. Projectile 394 comprises exterior portion 396 and interior portion 398. Exterior portion 396 comprises a deformable material, such as a packing material, for reducing friction between projectile 394 and longitudinal bore of barrel 42 upon acceleration of projectile 394 toward enclosed chamber 14. Exterior portion 396 is sized to fit snugly in first portion 46 of barrel 42 thereby forming a fluid barrier. Interior portion 398 of projectile 394 comprises a metal wedge.

The present invention is not limited to use with only compressed gas cylinders. Various types of containers may be positioned within enclosed chamber 14 for the safe, controlled release of such containers. Also, various projectiles may be designed in accordance with the present invention to improve the penetration capability with respect to a selected target.

Although the present invention and its advantages have been described in detail, substitutions and alterations can be made without departing from the spirit and scope of the invention as defined by the following claims.

What is claimed is:

1. A system for piercing a container disposed within a containment vessel comprising:
    a containment vessel having an interior portion, said containment vessel comprising means for gaining access to the interior portion and means for sealing the interior portion; and,
    a means for propelling a projectile comprising:
        a barrel having a bore therethrough from which the projectile is propelled, said barrel in communication with the interior portion of the containment vessel;
        a reservoir having a chamber therein, and having a first end connected to a first end of said bore of said barrel;
        a rupture disc disposed between said chamber and said bore to prevent communication between said chamber and said bore until a pressure in said chamber causes said rupture disc to rupture; and,
        a means for generating force within the chamber.

2. The system of claim 1 wherein the means for generating force within the chamber comprises a piston slidably disposed within said chamber to separate said chamber into at least a first portion and a second portion, wherein a pressure in said second portion forces said piston toward said rupture disk when a pressure in said first portion ruptures said rupture disk.

3. The system of claim 1 wherein the means for generating force within the chamber comprises:
    a piston slidably disposed within said chamber to separate said chamber into at least a first portion and a second portion;
    a spring disposed in said second portion having one end engaging a surface of said chamber and another end engaging said piston, wherein said spring forces said piston toward said rupture disk when a pressure in said first portion ruptures said rupture disk.

4. The system of claim 1 wherein the means for generating force within the chamber comprises:
    a first piston slidably disposed within said chamber;
    a second piston slidably disposed within said chamber and spaced from said first piston in a direction away from said rupture disk, wherein said first and second pistons separate said chamber into a first portion and a second portion, wherein said second piston has an end surface having a larger area than an end surface of said first piston, and wherein a pressure in said second portion forces said first and second pistons toward said rupture disk causing a pressure in said first portion to rupture said rupture disk.

5. The system of claim 1 wherein the means for generating force within the chamber comprises:
    a first piston slidably disposed within said chamber;
    a second piston slidably disposed within said chamber and spaced from said first piston in a direction away from said rupture disk, wherein said first and second pistons separate said chamber into a first portion and a second portion, wherein said second piston has an end surface having a larger area than an end surface of said first piston, and wherein a flammable gas mixture is ignited in said second portion to create an explosion which forces said first and second pistons toward said rupture disk causing a pressure in said first portion to rupture said rupture disk.

6. The system of claim 1 wherein the means for generating force within the chamber comprises:
    a first piston slidably disposed within said chamber;
    a second piston slidably disposed within said chamber and spaced from said first piston in a direction away from said rupture disk, wherein said first and second pistons separate said chamber into a first portion and a second portion, wherein said second piston has an end surface having a larger area than an end surface of said first piston; and
    a solid propellant disposed within said second portion, wherein said solid propellant is ignited to create an explosion which forces said first and second pistons toward said rupture disk causing a pressure in said first portion to rupture said rupture disk.

7. The system of claim 1 wherein the means for generating force within the chamber comprises a heating coil disposed within said chamber, wherein when said heating coil is energized, a liquid in said chamber is heated to create steam, thereby causing a pressure in said chamber to rupture said rupture disk.

8. The system of claim 1 wherein the means for generating force within the chamber comprises an electrode extending at least partially within said chamber, wherein when said electrode is energized, an electrolyte in said chamber is heated to create steam, thereby causing a pressure in said chamber to rupture said rupture disk.

9. A system for piercing a container disposed within a containment vessel comprising:
    a containment vessel having an interior portion, said containment vessel comprising means for gaining access to the interior portion and means for sealing the interior portion; and,
    a means for propelling a projectile comprising:
        a barrel having a bore therethrough from which the projectile is propelled, said barrel in communication with the interior portion of the containment vessel;

a reservoir having a chamber therein, and having a first end connected to a first end of said bore of said barrel;

a rupture disc disposed between said chamber and said bore to prevent communication between said chamber and said bore until a pressure in said chamber causes said rupture disc to rupture; and, a means for generating force within the chamber comprising a heating coil disposed about an exterior surface of said reservoir, wherein when said heating coil is energized, a cryogenic liquid in said chamber is heated, thereby causing a pressure in said chamber to rupture said rupture disk.

10. A containment vessel for gaining access to the contents of a container disposed within the containment vessel comprising;

an enclosed interior portion comprising means for accessing the interior portion and means for sealing the interior portion;

a pneumatic gun for propelling projectile means at the container, said pneumatic gun comprising:
 a barrel having a bore therethrough from which the projectile means is propelled;
 a reservoir having a chamber therein and having a first end connected to a first end of said bore of said barrel, said chamber comprising at least first and second portions; and,
 a rupture disc disposed between said chamber and said bore to prevent communication between said chamber and said bore until a pressure in said chamber causes said rupture disc to rupture;

whereby said pneumatic gun propels projectile means at the container to enable access to the contents of the container.

11. The containment vessel of claim 10 further comprising a piston slidably disposed within said chamber to separate said chamber into said first and second portions, wherein a pressure in said second portion forces said piston toward said rupture disk when a pressure in said first portion ruptures said rupture disk.

12. The containment vessel of claim 10 further comprising:

a piston slidably disposed within said chamber to separate said chamber into at least said first portion and said second portion;

a spring disposed in said second portion having one end engaging a surface of said chamber and another end engaging said piston, wherein said spring forces said piston toward said rupture disk when a pressure in said first portion ruptures said rupture disk.

13. The containment vessel of claim 10 further comprising:

a first piston slidably disposed within said chamber;

a second piston slidably disposed within said chamber and spaced from said first piston in a direction away from said rupture disk, wherein said first and second pistons separate said chamber into said first portion and said second portion, wherein said second piston has an end surface having a larger area than an end surface of said first piston, and wherein a pressure in said second portion forces said first and second pistons toward said rupture disk causing a pressure in said first portion to rupture said rupture disk.

14. The containment vessel of claim 10 further comprising:

a first piston slidably disposed within said chamber;

a second piston slidably disposed within said chamber and spaced from said first piston in a direction away from said rupture disk, wherein said first and second pistons separate said chamber into said first portion and said second portion, wherein said second piston has an end surface having a larger area than an end surface of said first piston, and wherein a flammable gas mixture is ignited in said second portion to create an explosion which forces said first and second pistons toward said rupture disk causing a pressure in said first portion to rupture said rupture disk.

15. The containment vessel of claim 10 further comprising:

a first piston slidably disposed within said chamber;

a second piston slidably disposed within said chamber and spaced from said first piston in a direction away from said rupture disk, wherein said first and second pistons separate said chamber into said first portion and said second portion, wherein said second piston has an end surface having a larger area than an end surface of said first piston; and a solid propellant disposed within said second portion, wherein said solid propellant is ignited to create an explosion which forces said first and second pistons toward said rupture disk causing a pressure in said first portion to rupture said rupture disk.

16. A containment vessel for gaining access to the contents of a container disposed within the containment vessel comprising;

an enclosed interior portion comprising means for accessing the interior portion and means for sealing the interior portion;

a pneumatic gun for propelling projectile means at the container, said pneumatic gun comprising:
 a barrel having a bore therethrough from which the projectile means is propelled;
 a reservoir having a chamber therein and having a first end connected to a first end of said bore of said barrel;
 a means for generating heat within said chamber; and,
 a rupture disc disposed between said chamber and said bore to prevent communication between said chamber and said bore until a pressure in said chamber causes said rupture disc to rupture;

whereby said pneumatic gun propels projectile means at the container to enable access to the contents of the container.

17. The containment vessel of claim 16 wherein the means for generating heat comprises a heating coil disposed within said chamber, said heating coil operative to heat a liquid in said chamber to create steam, thereby causing a pressure in said chamber to rupture said rupture disk.

18. The containment vessel of claim 16 wherein the means for generating heat comprises an electrode extending at least partially within said chamber, said electrode operative to heat an electrolyte in said chamber to create steam, thereby causing a pressure in said chamber to rupture said rupture disk.

19. A containment vessel for gaining access to the contents of a container disposed within the containment vessel comprising;

an enclosed interior portion comprising means for accessing the interior portion and means for sealing the interior portion;

a pneumatic gun for propelling projectile means at the container, said pneumatic gun comprising:

a barrel having a bore therethrough from which the projectile means is propelled;

a reservoir having a chamber therein and having a first end connected to a first end of said bore of said barrel;

a means for generating heat within said chamber; and, a rupture disc disposed between said chamber and said bore to prevent communication between said chamber and said bore until a pressure in said chamber causes said rupture disc to rupture;

whereby said pneumatic gun propels projectile means at the container to enable access to the contents of the container;

wherein the means for generating heat comprises a heating coil disposed about an exterior surface of said reservoir, said heating coil operative to heat a cryogenic liquid in said chamber, thereby causing a pressure in said chamber to rupture said rupture disk.

\* \* \* \* \*